(12) United States Patent
Nuernberger (10) Patent No.: US 9,562,628 B2
(45) Date of Patent: Feb. 7, 2017

(54) BRACKET FOR MOUNTING WIRING ON STUD

(75) Inventor: Eric Roland Nuernberger, Highland, IL (US)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 13/601,074

(22) Filed: Aug. 31, 2012

(65) Prior Publication Data
US 2014/0061399 A1 Mar. 6, 2014

(51) Int. Cl.
| | |
|---|---|
| F16L 3/08 | (2006.01) |
| F16L 3/137 | (2006.01) |
| H02G 3/32 | (2006.01) |
| F16L 3/12 | (2006.01) |
| A47B 96/00 | (2006.01) |
| A47K 1/00 | (2006.01) |
| A47K 5/00 | (2006.01) |
| E04G 5/06 | (2006.01) |

(Continued)

(52) U.S. Cl.
CPC ............ *F16L 3/137* (2013.01); *H02G 3/32* (2013.01); *F16L 3/233* (2013.01); *F16L 3/2332* (2013.01); *F16L 3/2334* (2013.01); *F16L 3/2336* (2013.01); *H02G 3/00* (2013.01); *H02G 3/126* (2013.01); *H02G 3/24* (2013.01); *H02G 3/26* (2013.01); *H02G 3/36* (2013.01); *H02G 3/386* (2013.01)

(58) Field of Classification Search
CPC .............. H02G 3/32; H02G 3/00; H02G 3/36; H02G 3/386; H02G 3/24; H02G 3/26; H02G 3/126; Y10T 29/49174; F16L 3/233; F16L 3/2332; F16L 3/2334; F16L 3/2336

USPC ............... 248/226.11, 227.3, 230.4, 230.5, 230.7,248/231.51, 231.61, 231.71, 231.81, 316.5,248/316.6, 316.7, 74.2, 74.1, 74.5; 174/99 R, 174/154, 480, 481, 54, 58, 61, 62, 63
See application file for complete search history.

(56) References Cited

U.S. PATENT DOCUMENTS

| | | | |
|---|---|---|---|
| 779,092 A | 9/1905 | Rosenfeld | |
| 810,004 A * | 1/1906 | Tabler | 248/61 |

(Continued)

FOREIGN PATENT DOCUMENTS

| | | |
|---|---|---|
| CA | 2040739 A1 | 1/1992 |
| DE | 33324 | 11/1885 |

OTHER PUBLICATIONS

Cooper B-Line, Spring Steel Fasteners Catalog, pp. 36, 37, 38, 40, undated, United States.

(Continued)

*Primary Examiner* — Brian Mattei
*Assistant Examiner* — Taylor Morris
(74) *Attorney, Agent, or Firm* — Senniger Powers LLP (57) ABSTRACT

A bracket for mounting wiring on a stud. The bracket includes a stud securement portion configured for attachment to a wall stud. A stationary jaw has a longitudinal axis extending laterally outward from adjacent a rear end of a side wall of the stud securement portion. A clamping jaw has a longitudinal axis extending laterally outward from adjacent the rear end of the side wall. The clamping jaw is at least one of pivotable relative to the stationary jaw and bendable along its longitudinal axis for clamping the wiring between the stationary jaw and the clamping jaw. A locking tie is secured to the clamping jaw adjacent the free longitudinal end of the clamping jaw. The locking tie includes a toothed, elongate member receivable in the locking opening (Continued)

to lock the free longitudinal end of the clamping jaw to the stationary jaw.

19 Claims, 5 Drawing Sheets

(51) Int. Cl.
| | |
|---|---|
| F21V 21/00 | (2006.01) |
| A47B 96/06 | (2006.01) |
| A47H 1/10 | (2006.01) |
| H02G 3/00 | (2006.01) |
| H02G 5/04 | (2006.01) |
| H02G 5/06 | (2006.01) |
| H01B 17/00 | (2006.01) |
| H02G 3/08 | (2006.01) |
| H02G 3/38 | (2006.01) |
| F16L 3/233 | (2006.01) |
| H02G 3/12 | (2006.01) |
| H02G 3/36 | (2006.01) |
| H02G 3/30 | (2006.01) |

(56) References Cited

U.S. PATENT DOCUMENTS

| | | | |
|---|---|---|---|
| 2,004,353 A | | 6/1935 | Sinnaeve |
| 2,179,406 A | | 11/1939 | Fitzpatrick |
| 2,340,249 A | | 1/1944 | Murphy |
| 2,376,314 A | | 5/1945 | Cogswell |
| 2,394,518 A | | 2/1946 | Kindorf |
| 2,896,887 A | | 7/1959 | Beltz |
| 2,918,240 A | | 12/1959 | Wiegand |
| 2,948,937 A | | 8/1960 | Rapata |
| 2,972,460 A | | 2/1961 | Kenyon |
| 2,972,461 A | | 2/1961 | Balbach et al. |
| 2,992,800 A | | 7/1961 | Madson |
| 3,090,826 A | | 5/1963 | Cochran |
| 3,098,273 A | | 7/1963 | Cochran |
| 3,194,524 A | | 7/1965 | Trumbull |
| 3,339,870 A | | 9/1967 | Damsgaard |
| 3,363,864 A | | 1/1968 | Olgreen |
| 3,376,005 A | | 4/1968 | Swanquist |
| 3,404,858 A | | 10/1968 | Levy |
| 3,417,438 A | | 12/1968 | Schuplin |
| 3,431,349 A | | 3/1969 | Hamilton |
| 3,861,015 A | | 1/1975 | Hooven |
| 4,032,096 A | | 6/1977 | Perrault et al. |
| 4,126,012 A | | 11/1978 | Waller |
| 4,141,524 A | | 2/1979 | Corvese, Jr. |
| 4,399,922 A | | 8/1983 | Horsley |
| 4,560,126 A | | 12/1985 | Judkins et al. |
| 4,566,660 A | | 1/1986 | Anscher et al. |
| 4,623,102 A | | 11/1986 | Hough, Jr. |
| 4,679,754 A | | 7/1987 | Richards |
| 4,709,888 A | | 12/1987 | Cubit et al. |
| 4,795,856 A | | 1/1989 | Farmer |
| 4,905,942 A | | 3/1990 | Moretti |
| 4,936,530 A | | 6/1990 | Wollar |
| 4,960,253 A | | 10/1990 | Perrault et al. |
| 5,067,677 A | | 11/1991 | Miceli |
| 5,085,384 A | | 2/1992 | Kasubke |
| 5,141,185 A | | 8/1992 | Rumbold et al. |
| 5,149,026 A | | 9/1992 | Allen |
| 5,149,027 A | | 9/1992 | Weber |
| 5,150,865 A | | 9/1992 | Miller |
| 5,188,318 A | | 2/1993 | Newcomer et al. |
| 5,401,905 A | * | 3/1995 | Lesser et al. ............... 174/99 R |
| 5,587,555 A | | 12/1996 | Rinderer |
| 5,632,457 A | * | 5/1997 | Neely, Jr. ........................ 248/69 |
| 6,355,887 B1 | * | 3/2002 | Gretz ........................ 174/72 A |
| 6,389,658 B1 | * | 5/2002 | Pfaller et al. ................... 24/545 |
| 6,572,058 B1 | * | 6/2003 | Gerardo ...................... 248/74.2 |
| 7,071,418 B2 | * | 7/2006 | Brockman et al. ........... 174/154 |
| 7,407,138 B1 | * | 8/2008 | Gretz .............................. 248/58 |
| 2005/0178580 A1 | * | 8/2005 | Holland .................. H02G 3/32 |
| | | | 174/173 |
| 2008/0142646 A1 | * | 6/2008 | Magno ..................... F16L 3/02 |
| | | | 248/65 |

OTHER PUBLICATIONS

Erico, Non-Metallic Sheathed Cable and MC/AC Cable Support, www.erico.com, not dated, 1 page, United States.
Erico, "Colorado Jim" Cable Support: CJ6, www.erico.com, 1 page, United States.
Thomas & Bets, Steel City, Box Hardware & Accessories, not dated, 1 page, Memphis, Tennessee United States.

* cited by examiner

BRACKET FOR MOUNTING WIRING ON STUD

FIELD OF THE INVENTION

The present invention generally relates to a bracket for mounting wiring on a stud.

BACKGROUND

In constructing or rehabbing buildings, homes, and the like, studs are secured vertically to define a frame for walls of the building. Electrical conductors, such as wiring, are secured to the studs to provide electricity and other utilities throughout the building. Plasterboard (drywall) is thereafter secured to the studs with screws, nails or other fasteners to form the walls of the building. Typically, nail or screw guns are used to rapidly and forcefully drive fasteners into the studs. Because the studs are behind the drywall, and because the fasteners are installed rapidly with a gun, it is not uncommon for a fastener to miss the stud during the installation process. This can damage an electrical conductor behind the wall. Electrical wiring for homes is typically 120 or 240 volts, and for commercial buildings, the voltages can be significantly higher. Thus, an installer is exposed to the risk of a severe electrical shock. A damaged wire may also create a dangerous fire hazard. Further, to decorate a completed building, pictures, clocks, lighting fixtures and other items are typically hung on walls using fasteners such as nails and screws. Since the electrical conductors behind these walls are hidden from view, the person hanging these items is exposed to the same hazards described above.

For these reasons, in 1990, the National Electrical Code (NEC) was amended to require that electrical conductors be secured at least one-and-one-quarter inches (1.25 in) behind the wall. Even in the absence of such regulation, it is, of course, prudent to secure electrical conductors a sufficient distance behind the wall to ensure that a nail or screw does not go through the wall into a conductor, thereby causing injury and/or creating a fire hazard.

SUMMARY

In one aspect, a bracket for mounting wiring on a stud generally comprises a stud securement portion configured for attachment to a wall stud. The stud securement portion includes a front wall and a side wall extending generally rearward from the front wall. A stationary jaw has a longitudinal axis extending laterally outward from adjacent a rear end of the side wall. A clamping jaw has a longitudinal axis extending laterally outward from adjacent the rear end of the side wall. The clamping jaw is at least one of pivotable relative to the stationary jaw and bendable along its longitudinal axis for clamping the wiring between the stationary jaw and the clamping jaw. The clamping jaw is positioned rearward of the stationary jaw such that the stationary jaw engages a front portion of the wiring and the clamping jaw engages a rear portion of the wiring when the wiring is clamped therebetween. The stationary jaw is rigid, relative to the clamping jaw, along its longitudinal axis such that the stationary jaw remains substantially stationary relative to the stud securement portion as the wiring is clamped between the stationary jaw and the clamping jaw.

In another aspect, a bracket for mounting wiring on a stud generally comprises a stud securement portion configured for attachment to a wall stud. The stud securement portion includes a front wall and a side wall extending generally rearward from the front wall. A stationary jaw has a longitudinal axis extending laterally outward from adjacent a rear end of the side wall. The stationary jaw has a free longitudinal end spaced from the side wall of the stud securement portion and a locking opening adjacent the free longitudinal end. A clamping jaw has a longitudinal axis extending laterally outward from adjacent the rear end of the side wall. The clamping jaw is at least one of pivotable relative to the stationary jaw and bendable along its longitudinal axis for clamping the wiring between the stationary jaw and the clamping jaw. The clamping jaw has a free longitudinal end spaced from the side wall of the stud securement portion. A locking tie is secured to the clamping jaw adjacent the free longitudinal end of the clamping jaw. The locking tie includes a toothed, elongate member receivable in the locking opening to lock the free longitudinal end of the clamping jaw to the stationary jaw.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE DRAWINGS

Figure 4:
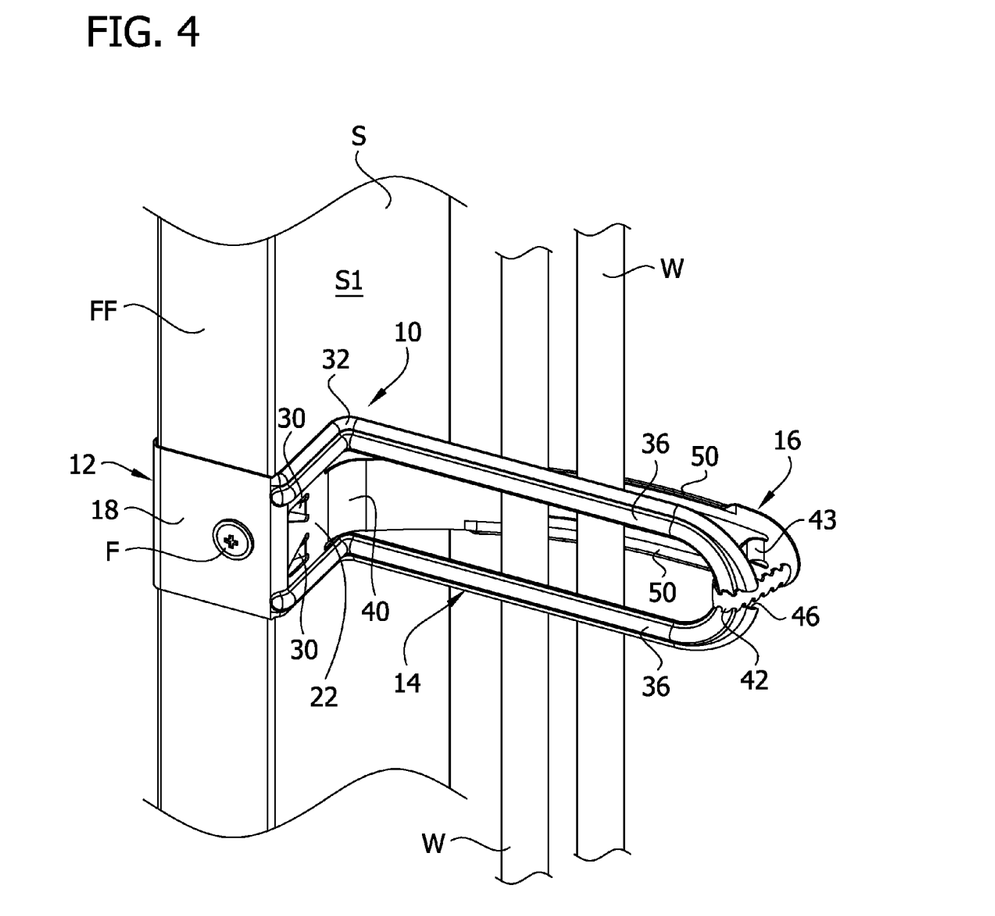
FIG. 4 is a perspective of the bracket mounting wiring to a metal stud.
Figure 5:
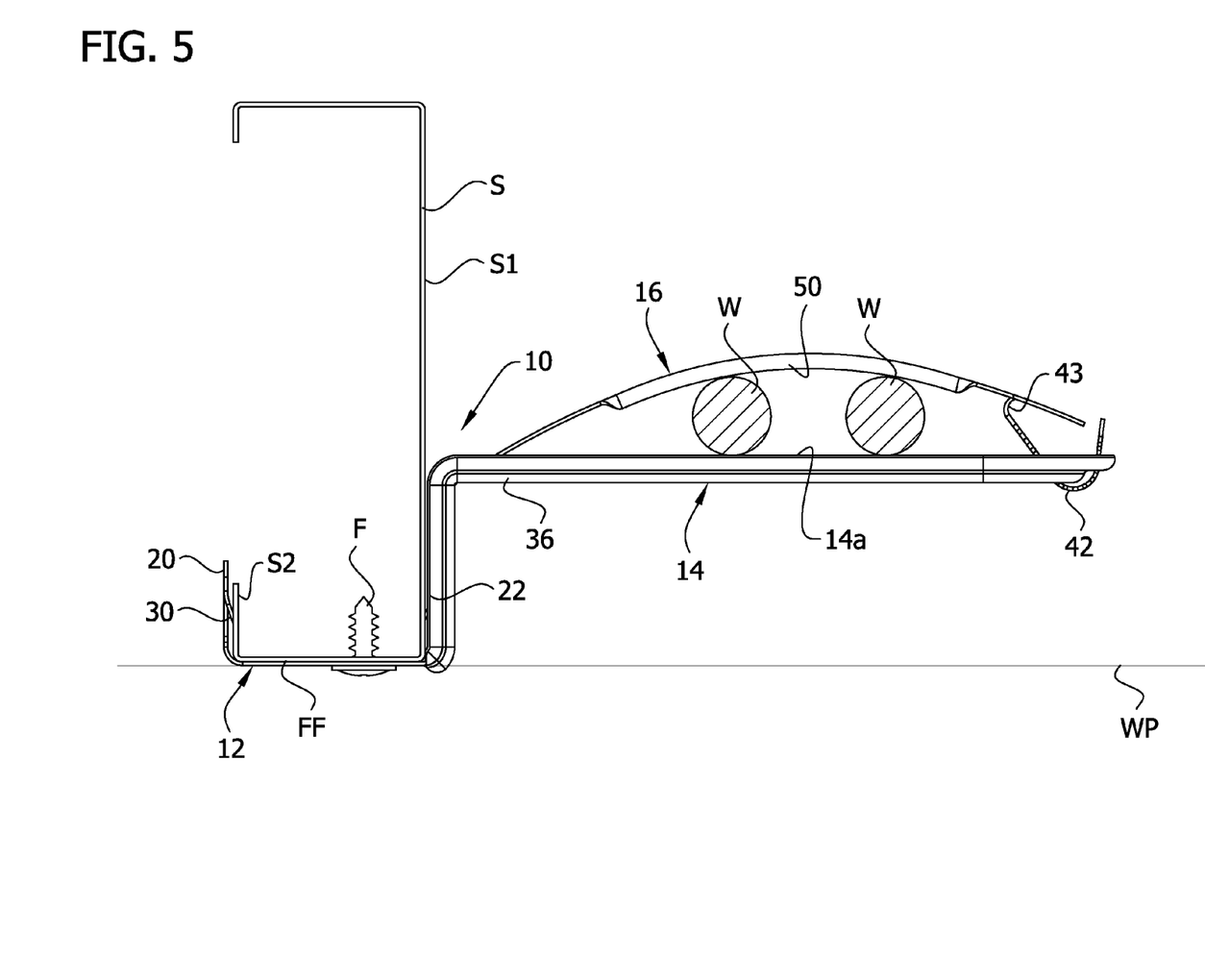
FIG. 5 is a top plan view of FIG. 4.

Referring now to the Figures, a bracket for mounting wiring on a stud S is generally indicated by reference numeral 10. The bracket 10 includes a stud securement portion, generally indicated at 12, and a pair of jaws, namely, a stationary jaw, generally indicated at 14, and a clamping jaw, generally indicated at 16, extending outward from the stud securement portion. The stud securement portion 12 is used to secure the bracket 10 to a stud S (FIGS. 4 and 5), such as a metal stud, as illustrated, or a wood stud, and the respective jaws 14, 16 are used to secure wiring W to the bracket such that the wiring runs generally parallel to the stud and is spaced a suitable distance from a wall plane WP (FIG. 5).

The stud securement portion 12 includes a front wall 18 and first and second side walls 20, 22, respectively, extending generally rearward from the front wall to generally define a channel-shaped opening 24. As used herein, terms denoting relative positions of bracket components and structures, such as, but not limited to, "front" and "rearward," are meant to describe the relative positions of the components and structures of the bracket 10 when the bracket is secured to the stud S. As shown in FIGS. 4 and 5, the stud securement portion 12 is sized and shaped to receive a stud S within the channel-shaped opening 24. In particular, when the stud S is received in the channel-shaped opening 24, an interior surface of the front wall 18 of the stud securement portion 12 abuts a front face FF of the stud, and the interior surfaces of the opposite side walls 20, 22 of the stud securement portion abut respective opposite sides S1, S2 of the stud. The front wall 18 of the stud securement portion 12 includes a fastener opening 28 (FIG. 1) for receiving a fastener F (e.g., a nail or screw; FIGS. 4 and 5) that is driven into the front face FF of the stud S to secure the bracket to the stud.

Figure 2:
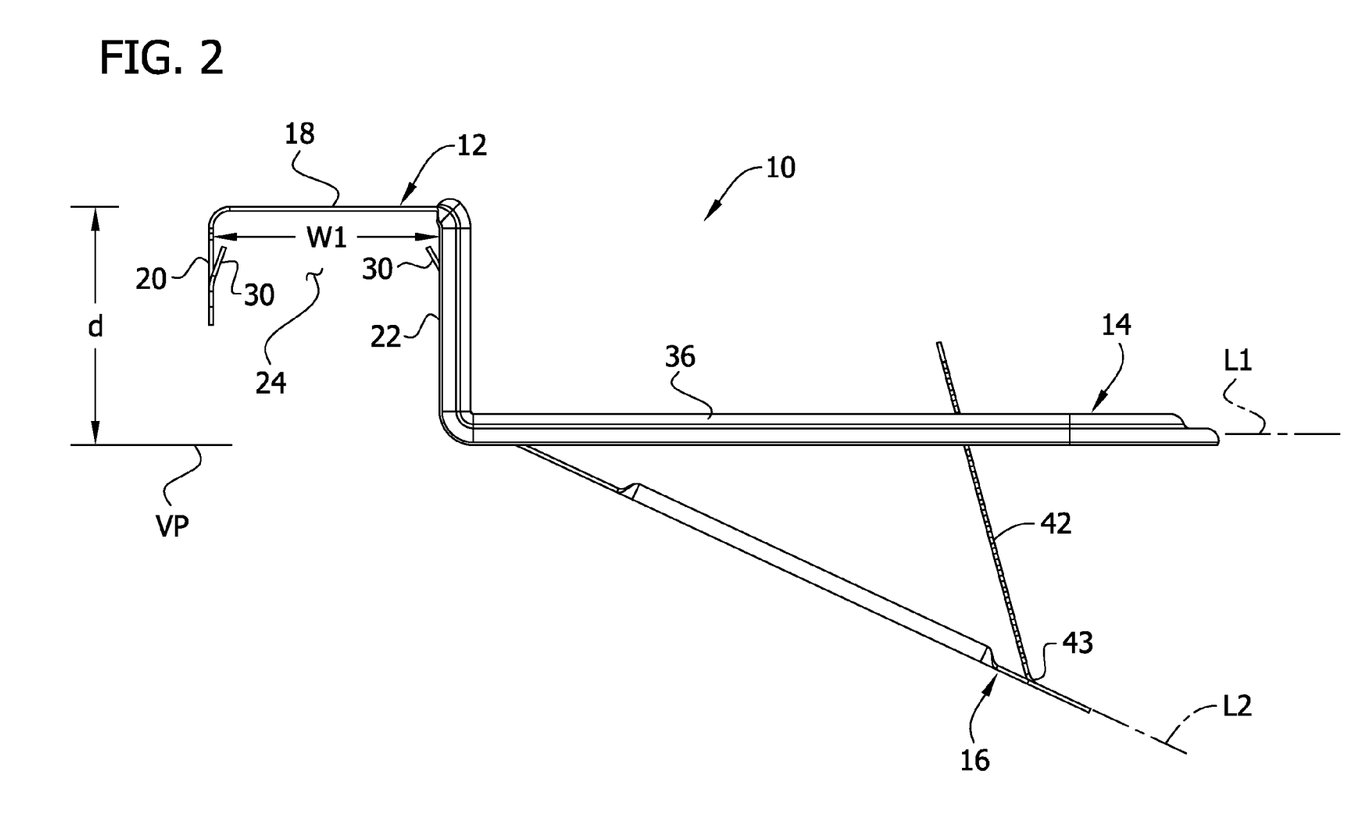
FIG. 2 is a front elevational view of the bracket.

In the illustrated embodiment, the stud securement portion 12 is configured to be press fit onto the stud S to fasten the stud securement portion to the stud before fastening the bracket 10 to the stud using the fastener F. In one example, the side walls 20, 22 may be resiliently deflectable laterally outward from the front wall 18, and the channel-shaped opening 24 defined by the stud securement portion 12 may have an interior width W1 (e.g., measuring about 1.180 in; FIG. 2), extending between interior surfaces of the opposite side walls 20, 22 that is less than the exterior width of the stud (e.g., about 1⅝ in), such that the side walls 20, 22 resiliently deflect laterally outward as the stud S is received in the channel-shaped opening. In the illustrated embodiment, each of the side walls 20, 22 includes at least one barb, and desirably two barbs 30, configured to engage and dig into the opposite sides S1, S2 of the stud as the stud securement portion 12 is press fit on the stud S. As shown in FIGS. 4 and 5, the barbs 30 on the side wall 22 engage and dig into the side S1 of the metal stud that is the web of the metal stud, and the barbs on the side wall 20 engage and dig into the side S2 of the metal stud that is a return flange. As such, the stud securement portion 12 functions generally as a clip that is capable of clipping the bracket 10 on the metal stud. The barbs 30 may also be configured to dig into a wood stud. Accordingly, in this example the stud securement portion 12 functions to fasten the bracket 10 in a selected position on the stud before installing the fastener F. In this way, the person (e.g., the installer) installing the bracket 10 may have both hands free to insert the fastener F into the fastener opening 28 and drive the fastener into the stud S. That is, the installer does not need to hold the bracket 10 in place on the stud S with one hand, while using the other hand to fasten the bracket to the stud S. It is understood that in at least some embodiments the stud securement portion 12 may have other configurations without departing from the scope of the present invention. For example, in some embodiments the stud securement portion 12 may not be configured for press fit securement to the stud S, and/or the securement portion may not have the barbs 30.

Referring to FIG. 2, the stationary and clamping jaws 14, 16 have respective longitudinal axes L1, L2 extending laterally outward adjacent a rear end of at least one of the side walls of the stud securement portion 12 (e.g., the second side wall 22 in the illustrated embodiment). The stationary jaw 14 extends generally orthogonal to the second side wall 22 and is disposed in front of the clamping jaw 16. Substantially an entire rear surface 14a of the stationary jaw 14 that engages wiring W is coplanar with or lies rearward of a vertical plane VP that is spaced a distance d from the front wall 18 of the stud securement portion 12 measuring at least 1.25 in, so that, as explained in more detail below, wiring W held between the jaws 14, 16 is spaced at least 1.25 in from the wall plane WP. The stationary jaw 14 is substantially rigid along its longitudinal axis L1. In particular, the stationary jaw 14 is suitably rigid such that the stationary jaw does not substantially bend along its longitudinal axis L1 when wiring W is being secured (e.g., sandwiched) between the jaws. Moreover, a junction 32 (FIG. 1) between the stationary jaw 14 and the second side wall 22 is also generally rigid, and non-bendable such that the stationary jaw does not pivot about the junction as wiring W is being secured (e.g., sandwiched) between the jaws. The illustrated stationary jaw 14 has a central opening 34 (which may be formed when forming the clamping jaw 16). A stiffening rib 36 extends along the second side wall 22 and along the periphery of the stationary jaw 14 to stiffen and rigidify the stationary jaw and the junction 32 between the stationary jaw and the second side wall. The stationary jaw 14 may be of other configurations without departing from the scope of the present invention.

Figure 1:
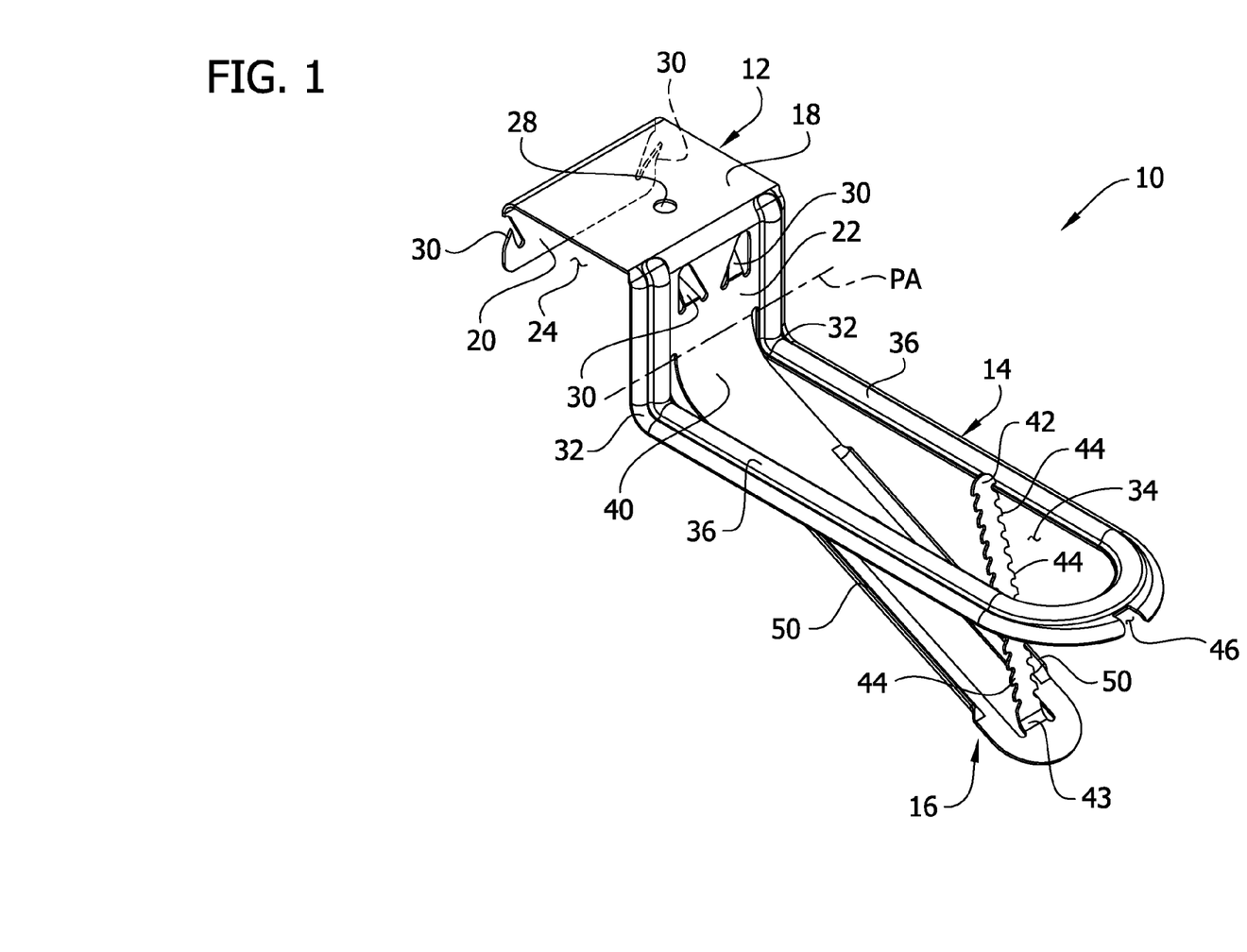
FIG. 1 is a perspective of a bracket for mounting wiring on a stud.
Figure 3:
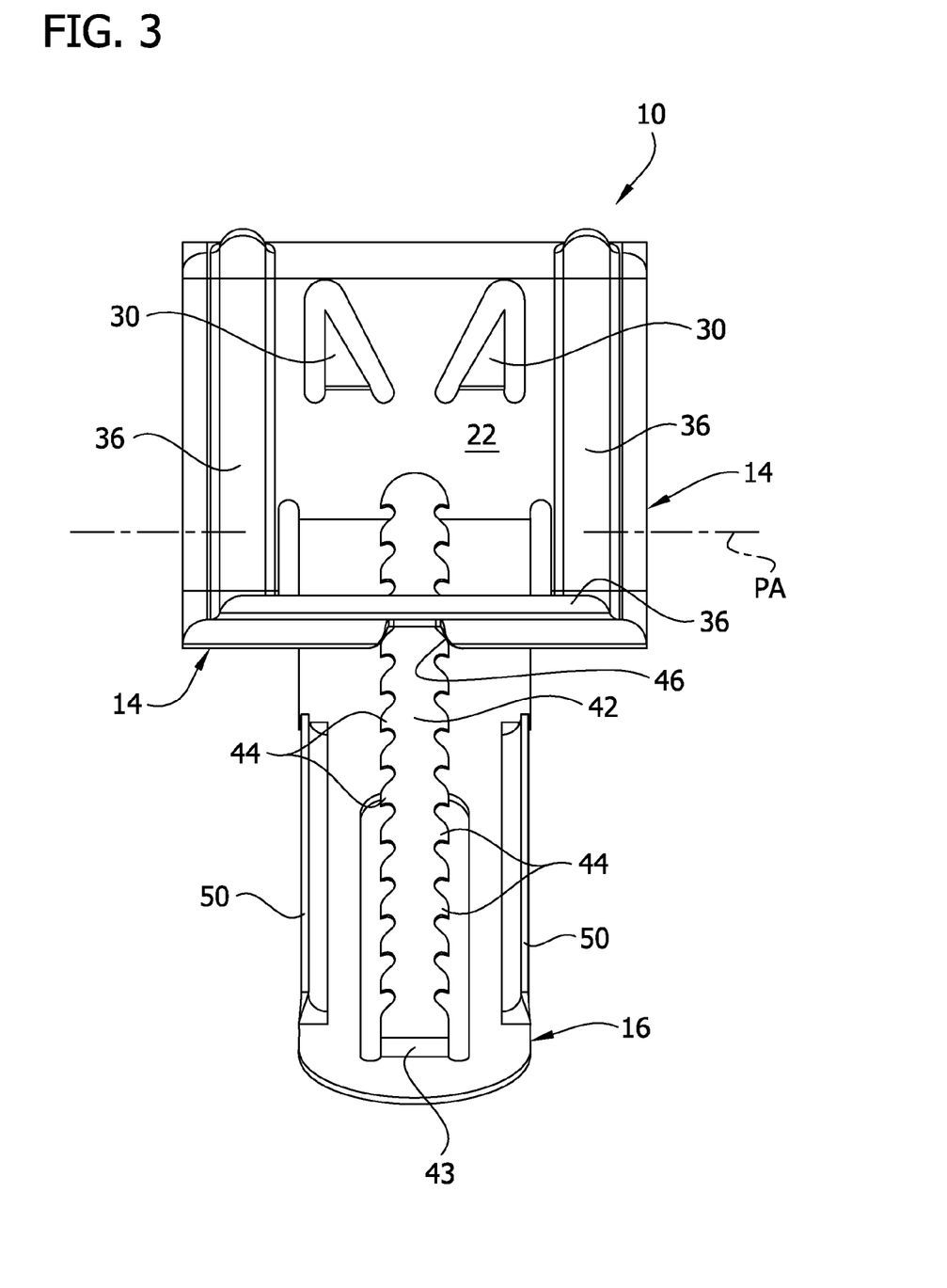
FIG. 3 is a right elevational view of the bracket.

The clamping jaw 16 is connected to the second side wall 22 of the stud securement portion 12 by a hinge portion 40 (e.g., a living hinge; FIGS. 1 and 4), adjacent the rear end of the second side wall, that allows the clamping jaw to pivot about a pivot axis PA (FIGS. 1 and 3) that is generally orthogonal to the longitudinal axis L2 of the clamping jaw. The clamping jaw 16 is pivotable relative to the stationary jaw 14 between an open position (FIGS. 1-3) to allow the wiring W to be inserted between the jaws, and a closed, clamping position (FIGS. 4 and 5), in which the wiring is held between the jaws. The clamping jaw 16 includes a locking tie 42 extending outward from generally adjacent a free longitudinal end of the clamping jaw. The locking tie 42 is generally pivotable relative to the clamping jaw 16, such as by a living hinge 43, and includes a plurality of teeth 44 (FIGS. 1 and 3) spaced apart from one other along the length of the tie. The locking tie 42 is receivable in a locking slot 46 adjacent a free longitudinal end of the stationary jaw 14 such that the teeth 44 on the tie engage the stationary jaw to fasten (e.g., releasably fasten) the clamping jaw 16 to the stationary jaw in the closed position. The clamping jaw 16 is also generally bendable along at least a portion of its longitudinal axis L2 to allow the jaw to bend and generally conform to the shape of the wiring W to grip and hold the wiring, as shown in FIGS. 4 and 5. The illustrated clamping jaw 16 includes upper and lower gripping flanges 50 to facilitate gripping of the wiring W held between the jaws 14, 16. It is understood that in other embodiments the clamping jaw 16 may be only one of pivotable about the pivot axis PA and bendable along its longitudinal axis L2 in order to clamp and hold the wiring W without departing from the scope of the present invention. The clamping jaw 16 may have other configurations without departing from the scope of the present invention.

In one embodiment, the bracket 10 is formed as a single, unitary, one-piece structure. For example, the bracket 10 may be fabricated from a single sheet of metal, such as by bending and cutting the single sheet of metal to form the respective components and structure. The single sheet of metal may be steel, and may have a thickness of about 0.023 in. Other ways of forming the bracket 10 do not depart from the scope of the present invention.

The following is an exemplary, non-limiting method of mounting wiring to the stud S using the illustrated bracket 10. The stud securement portion 12 is press fit on the stud S such that the stud is received in the channel-shaped opening 24, as explained above. When press fitting the bracket 10 on the metal stud S, the barbs 30 on one side wall 20 engage and dig into the side S2 of the metal stud that is a return flange, and the barbs on the opposite side wall 22 engage and dig into the side S1 of the metal stud S that is a web. That is, the stud securement portion 12 is clipped onto the metal stud S. When press fitting the bracket 10 on a wood stud, the barbs 30 may also dig into the stud. The bracket 10 remains in position on the stud S, and the installer is able to use both hands to insert the fastener F into the fastener opening 28 and drive the fastener into the stud S. In other embodiments, the bracket 10 may be secured to the stud S in other ways.

With the bracket 10 secured to the stud S and the clamping jaw 16 in its open position (FIGS. 1-3), the wiring W is inserted between the clamping jaw and the stationary jaw 14.

Alternatively, the wiring W may be inserted between the jaws 14, 16 before securing the bracket 10 to the stud S. With the wiring W inserted between the jaws 14, 16, the clamping jaw 16 is pivoted forward about its pivot axis PA to close the clamping jaw. In one example, the locking tie 42 extends through the central opening 34, as shown throughout the drawings, and the installer may pull on the locking tie 42 to pivot the clamping jaw 16 forward. As the clamping jaw 16 engages a rear portion of the wiring W and the rear surface 14a of the stationary jaw 14 engages a front portion of the wiring, the clamping jaw bends along its longitudinal axis L2 to generally conform the clamping jaw across the wiring. With the wiring W snugly held between the jaws 14, 16, the locking tie 42 is bent across the stationary jaw 14 and then inserted into the locking slot 46 (broadly, a locking opening) such that the teeth 44 on the tie engage the stationary jaw to fasten (e.g., releasably fasten) the clamping jaw 16 to the stationary jaw in the closed position.

Having described the invention in detail, it will be apparent that modifications and variations are possible without departing from the scope of the invention defined in the appended claims.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A bracket for mounting wiring on a stud, the bracket comprising:
    a stud securement portion configured for attachment to a wall stud, the stud securement portion including a front wall and a side wall extending generally rearward from the front wall;
    a stationary jaw having a longitudinal axis extending laterally outward from adjacent a rear end of the side wall;
    a clamping jaw having a first longitudinal end integrally formed with the side wall of the stud securement portion adjacent a rear end of the side wall, a second longitudinal end spaced laterally from the side wall of the stud securement portion, and a longitudinal axis extending between the first and second longitudinal ends of the clamping jaw, the clamping jaw being at least one of the following for clamping the wiring between the stationary jaw and the clamping jaw: pivotable relative to the stationary jaw and bendable along its longitudinal axis;
    wherein a portion of the clamping jaw including the second longitudinal end is positioned rearward of the stationary jaw such that the stationary jaw engages a front portion of the wiring and the clamping jaw engages a rear portion of the wiring when the wiring is clamped therebetween,
    wherein the stationary jaw is rigid, relative to the clamping jaw, along its longitudinal axis such that the stationary jaw remains substantially stationary relative to the stud securement portion as the wiring is clamped between the stationary jaw and the clamping jaw,
    wherein the stationary jaw includes a free longitudinal end spaced from the side wall of the stud securement portion,
    wherein the clamping jaw includes a locking tie adjacent its second longitudinal end to lock the second longitudinal end of the clamping jaw to the stationary jaw.

2. The bracket set forth in claim 1, wherein the clamping jaw is bendable along its longitudinal axis for clamping the wiring between the stationary jaw and the clamping jaw.

3. The bracket set forth in claim 1, wherein the stationary jaw defines a locking slot adjacent the free longitudinal end of the stationary jaw, and wherein the locking tie includes a toothed, elongate member receivable in the locking slot to lock the clamping jaw to the stationary jaw.

4. The bracket set forth in claim 1, wherein a rear surface of the stationary jaw that engages the wiring clamped between the stationary and clamping jaws is spaced at least about 1.25 in from a rear surface of the front wall of the stud securement portion.

5. The bracket set forth in claim 1, wherein the bracket further comprises a stiffening rib extending along the side wall and along the stationary jaw to stiffen and rigidify the stationary jaw along its longitudinal axis and the junction between the stationary jaw and the side wall.

6. The bracket set forth in claim 1, wherein the stud securement portion, the stationary jaw, and the clamping jaw are integrally formed as a single, unitary, one-piece structure.

7. The bracket set forth in claim 1, wherein the side wall constitutes a first side wall, the stud securement portion including a second side wall extending generally rearward from the front wall in generally opposing relationship to the first side wall, wherein the front wall and the first and second side walls define a channel-shaped opening sized and shaped for press fitting the stud securement portion on the stud to fasten the bracket to the stud.

8. The bracket set forth in claim 7, wherein the stud securement portion includes a barb extending from at least one of the first and second side walls into the channel-shaped opening, the barb configured to engage a portion of the wall stud when the stud is received in the channel-shaped opening to fasten the stud securement portion on the wall stud.

9. The bracket set forth in claim 8, wherein the barb includes a first barb on the first side wall and a second barb on the second side wall.

10. The bracket set forth in claim 9, wherein the stud securement portion is configured for attachment to a metal wall stud having a return flange on a first side and a web on a second side, wherein the first barb is configured to engage the return flange of the metal wall stud, and the second barb is configured to engage the web of the metal wall stud to fasten the stud securement portion on the metal wall stud.

11. The bracket set forth in claim 10, wherein the first barb includes at least two first barbs, and the second barb includes at least two second barbs.

12. The bracket set forth in claim 11, wherein the front wall, the first and second side walls, and the barbs are integrally formed as a one-piece structure.

13. The bracket set forth in claim 12, wherein the stud securement portion includes a fastener opening in the front wall for receiving a fastener therethrough to secure the stud securement portion to the wall stud.

14. The bracket set forth in claim 1, wherein the stationary jaw has a first longitudinal end connected to the side wall of the stud securement portion adjacent the rear end of the side wall, and a second longitudinal end spaced laterally from the side wall of the stud securement portion, the stationary jaw defining a central opening extending from adjacent the first longitudinal end of the stationary jaw to adjacent the second longitudinal end of the stationary jaw, wherein the clamping jaw generally opposes the central opening of the stationary jaw.

15. The bracket as set forth in claim 1, wherein the clamping jaw is struck from the stationary jaw.

16. The bracket as set forth in claim 1, wherein the locking tie is struck from the clamping jaw.

17. A bracket for mounting wiring on a stud, the bracket comprising:

a stud securement portion configured for attachment to a wall stud, the stud securement portion including a front wall and a side wall extending generally rearward from the front wall;

a stationary jaw having a longitudinal axis extending laterally outward from adjacent a rear end of the side wall, the stationary jaw having a free longitudinal end spaced from the side wall of the stud securement portion and a locking opening adjacent the free longitudinal end;

a clamping jaw having a first longitudinal end connected to the side wall of the stud securement portion adjacent a rear end of the side wall, a second longitudinal end spaced laterally from the side wall of the stud securement portion, and a longitudinal axis extending between the first and second longitudinal ends of the clamping jaw, the clamping jaw being at least one of the following for clamping the wiring between the stationary jaw and the clamping jaw: pivotable relative to the stationary jaw and bendable along its longitudinal axis;

a locking tie struck from the clamping jaw, wherein the locking tie is pivotally connected to the clamping jaw adjacent the second longitudinal end of the clamping jaw, wherein the locking tie includes a toothed, elongate member receivable in the locking opening of the stationary jaw to lock the second longitudinal end of the clamping jaw to the stationary jaw, wherein a portion of the clamping jaw including the second longitudinal end is positioned rearward of the stationary jaw such that the stationary jaw engages a front portion of the wiring and the clamping jaw engages a rear portion of the wiring when the wiring is clamped therebetween, wherein the stationary jaw is rigid, relative to the clamping jaw, along its longitudinal axis such that the stationary jaw remains substantially stationary relative to the stud securement portion as the wiring is clamped between the stationary jaw and the clamping jaw.

18. The bracket set forth in claim 17, wherein the locking tie is hingedly attached to the clamping jaw.

19. The bracket set forth in claim 17, wherein the locking opening comprises a slot in the free longitudinal end of the stationary jaw.

\* \* \* \* \*